UNITED STATES PATENT OFFICE.

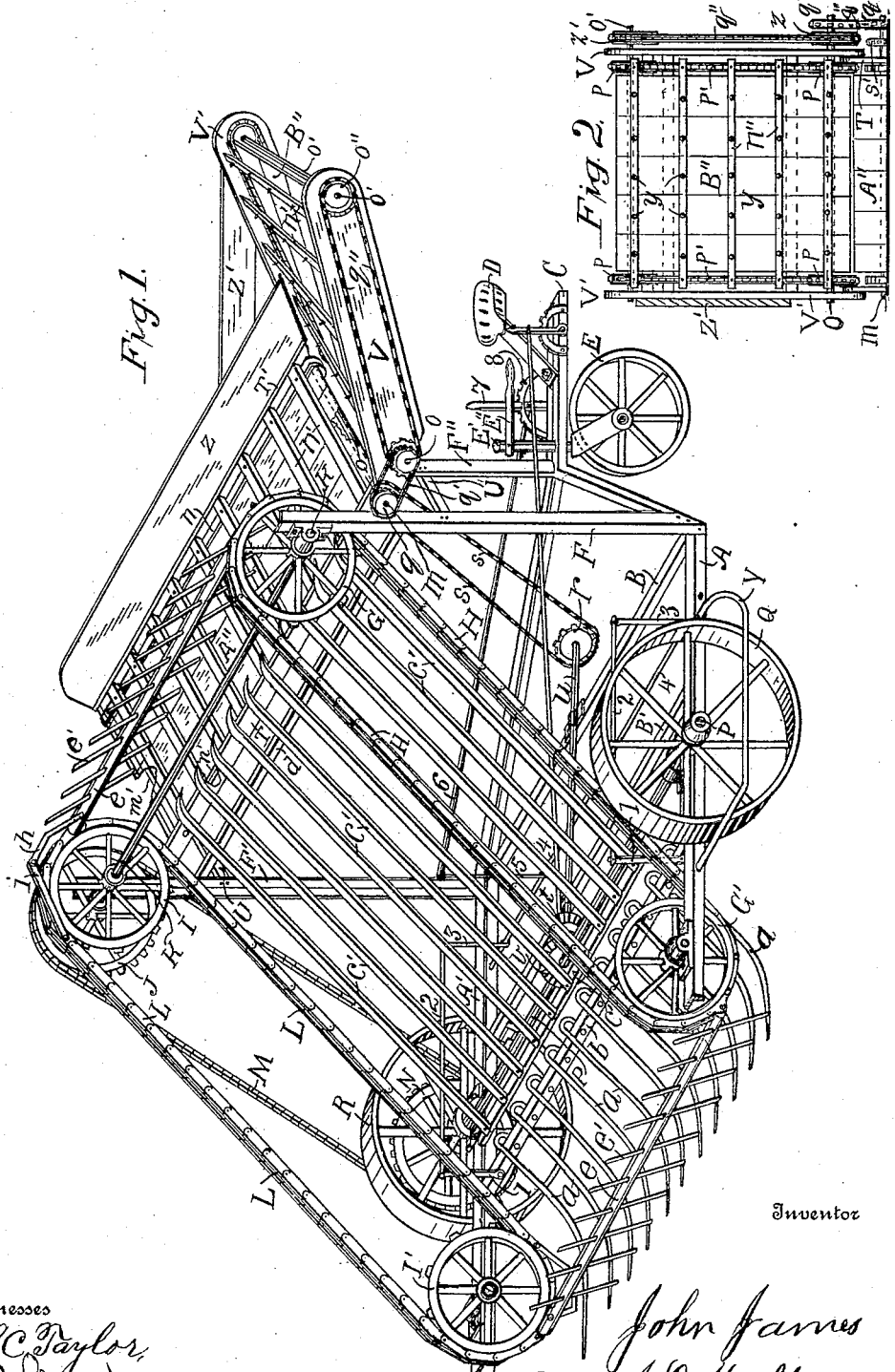

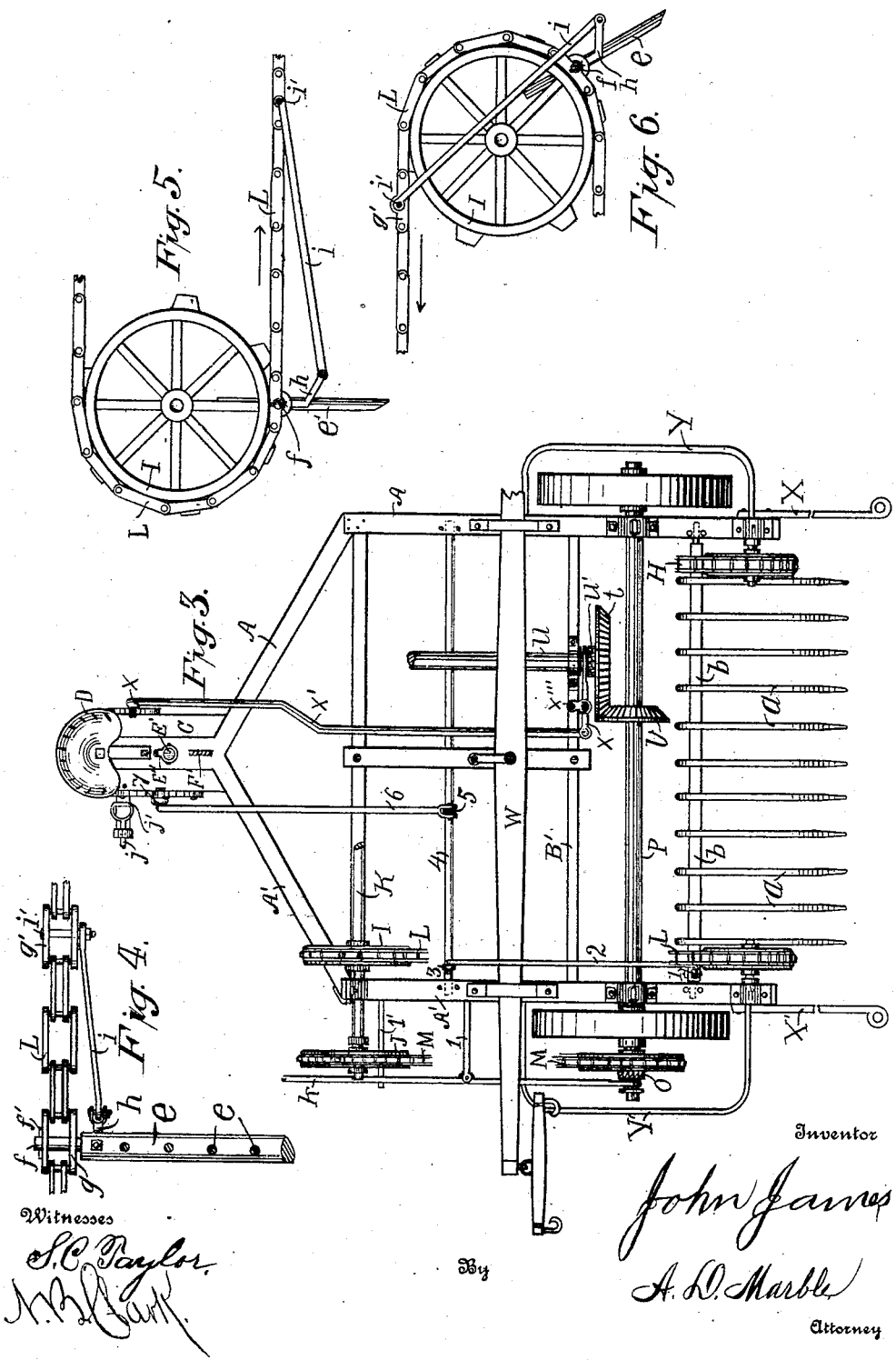

JOHN JAMES, OF OKLAHOMA, OKLAHOMA.

GRAIN-SHOCK ELEVATOR.

No. 915,183.   Specification of Letters Patent.   Patented March 16, 1909.

Application filed August 21, 1907. Serial No. 389,487.

To all whom it may concern:

Be it known that I, JOHN JAMES, a citizen of the United States, residing at Oklahoma city, in the county of Oklahoma, Oklahoma, have invented certain new and useful Improvements in Grain-Shock Elevators, of which the following is a specification.

My invention relates to grain shock elevators, in which a frame is mounted upon a pair of front traction wheels and a rear guiding wheel; a series of forwardly projecting fingers to glide under the shocks to raise them from the ground, a pair of rakes extending across the machine and having their ends pivotally secured to a pair of chain belts carried by four sprocket wheels to slide the grain shocks up a first or primary elevator, a transverse carrier being provided to carry and deliver the said shocks to a secondary elevator to elevate and discharge them onto a wagon or other conveyance, the said rakes having position and tilting devices secured thereto and to their belts, all of which will hereinafter be fully described and pointed out in the claims.

The objects of my invention are to provide a machine by which shocks of grain can be taken from the field, elevated and discharged at its side onto a wagon or other conveyance to transport the same to a thresher; to save time and labor in the process of threshing shocked grain. I accomplish these objects by the mechanism illustrated in the accompanying drawings, forming a part of this specification, in which—

Figure 1 is a perspective of the machine embodying the elements of my invention; Fig. 2 is a plan view of the secondary or discharging elevator; Fig. 3 is a plan view of the lower frame, obscuring parts being removed; Fig. 4 is a plan view of part of one of the pairs of chain belts and one of the rakes showing the tilting device; Fig. 5 is an elevation of a portion of one of the chain belts with its rake-tilting device and one of the four like sprocket wheels; Fig. 6 is similar to Fig. 5, showing the rake in a discharging position.

Similar letters refer to similar parts in the several views.

Referring to the drawings, it will be seen that the side sills A and A' are stayed by a cross sill B from which point the side sills rearwardly converge and unite in one double-sill projection C, having a driver's seat D secured thereon and being carried by a caster guide wheel E; at the converging bend in the side sills the upright posts F and F' have their feet secured thereto; said posts have journaled at their upper ends the shaft K with the sprocket wheels J, K and G, the two latter carrying the chain belts H and L, being rotated by the sprocket wheel J, the chain belt M and the sprocket wheel N by means of the clutch O (see Fig. 3) secured upon the main driving shaft P supporting the framework of the machine and being rotated by the two traction wheels Q and R.

To raise the shocks of grain from the ground a series of forwardly projecting fingers $a$, $a$, $a$ having their forward end portions bent upwardly to glide under the shocks of grain and having their rear ends bent downward and forward and secured in the rear side of the fork head $b$ having its ends pivotally secured in the sills A and A' a short distance forward from their bearings; a short distance rearward from said fork head a cross bar $c$ is placed having its ends bolted to the sills A and A' to form a support for the lower ends of the elevator slats $c'$, $c'$ constituting a support for the ascending grain shocks, the upper ends of said slats being secured to the cross bar $d$, having its ends bolted to the posts F and F'.

To force the shocks of grain to ascend upward on the slats $c'$, $c'$, a plurality of horizontal rake heads $e$, $e$ are provided having a series of teeth $e'$, $e'$ secured transversely therein and projecting in opposite directions therefrom, the said rake heads having their ends pivotally attached to the chain belts H and L by means of the rake head journals $f$ passing laterally through openings provided therefor in the links $g$ of said chain belts, the journals $f$ being perforated for cotter pins $f'$, see Figs. 1, 3 and 4. To provide means to force the rake teeth $e'$ $e'$ to engage and discharge the grain shocks properly each rake head $e$ has near its ends firmly secured therein laterally projecting yokes $h$, having pivotally secured thereto one end of the rake controlling and tilting rods $i$ their opposite ends being pivotally secured to the links $g'$ of the chain belts H and L by the bolts $i'$ passing through said links and the forward ends of said tilting rods, the bolts $i'$ being threaded and provided with nuts $i''$ to insure engagement, see Fig. 4; by this device positiveness of movement and position of the rake teeth are maintained and the upward movement of their points materially retarded at the time of discharging the grain shocks thus making a clean discharge, see Fig. 6, in which position the rake teeth are shown as having made the discharge, the direction of movement being indicated by the arrow.

Near the front ends of the side sills A and A' are journaled the duplicate sprocket wheels I' and G' carrying the chain belts H and L operating the rakes $e$ attached thereto, see Figs. 1 and 3. To disengage the clutch O and thus throw the raking mechanism out of gear, any convenient device may be adopted, that shown in Fig. 3 being preferable, in which a rod $j$ having a handle $j'$ within reach of the operator is attached to the lever rod $k$, its front end being U-shaped and engaging the said clutch, the said rod being pivoted to a supporting bar $l$ and having an auxiliary supporting bar $l'$ both being secured to the side sill A' and extending horizontally outward therefrom.

The elevator above described is properly a primary elevator constructed for rearward delivery; to establish a side delivery machine a transverse platform-like carrier A'' is provided, consisting of the side plates T and T' having their lower edges resting upon the horizontal supporting arms U and U' having their inner ends secured to the frame posts F and F' and extending rearwardly and being supported by the rear post F'', the foot of which is secured in the united portion of the said sills. The said side plates T and T' have journaled in their ends the horizontal shafts $m$ and $m'$ having mounted thereon four like belt pulleys to operate the belts $n$ to which the series of slats $n'$ are secured, for the purpose of moving the grain shocks in a direction transversely to the machine and delivering them to the secondary or discharging elevator B'' consisting of duplicate side plates V and V' having their lower ends secured to the side plates T and T', at an angle therewith, and having journaled in their upper and lower ends the horizontal elevator shafts $o$ and $o'$ having mounted thereon the four belt sprocket pulleys $p$ to operate the pair of chain belts $p'$, $p'$ having secured thereto the elevator slats $n''$ provided with short barbs $y$ to elevate and discharge the grain shocks. To operate the said belts ($p'$) the shafts $o$ and $o'$ have secured thereon the sprocket wheels $z$ and $z'$ provided with the chain belt $q''$ and driven by means of the sprocket wheels $q$ and $q'$ mounted upon the shafts $m$ and $o$ and the short chain belt $q'''$ adapted to said wheels; the shaft $m$ being rotated by the sprocket wheel $s'$ secured thereon and, by its driving belt $s$ engaging the sprocket wheel $r$ secured upon the rear end of the horizontal driving shaft $u$ having secured upon its forward end the bevel pinion $t$ to operate the said carrier and the secondary or discharging elevator B''; the said driving shaft $u$ is journaled upon the cross sill B and the cross-bar B' having their ends secured to the side sills A and A', and to provide for rotating said driving shaft the bevel wheel $v$ is secured upon the main shaft P of the machine and rotated by the traction wheels Q and R.

To provide for disengaging the bevel pinion $t$ with the bevel wheel $v$ the ratchet $u'$ is placed upon the shaft $u$ in a manner to slide into and out of engagement with the ratchet portion of the said bevel pinion, and to actuate the ratchet $u'$ and thus throw the carrier A'' and the secondary elevator B'' in and out of gear, the lever support $x'''$ is secured to the cross-bar B' and has pivotally secured in its free end the actuating lever $x''$ having attached thereto the operating rod $x'$ attached to the driver's controlling lever $x$, see Fig. 3.

To the front ends of the side sills A and A' are secured the lead rods X and X' having eyes in their front ends in which to tie the lead-straps of the horses' bridles; and to prevent the horses being injured by the traction wheels of the machine the guards or fenders Y and Y' are provided, having their ends secured to the said side sills and having their body portions extending parallel with the machine and outside thereof, see Fig. 3.

In operation the fork fingers $a, a, a, a$ glide under the grain shocks and raise the same from the ground bringing them within reach of the rakes $e, e$ which seize the grain shocks and force them up the primary elevator and discharge them upon the transverse carrier A'' which carries them to the foot of the secondary or discharging elevator B'', which dumps them onto a wagon or other conveyance prepared to receive and transport them to the threshing machine.

Having thus described my invention what I claim as new and desire to secure by Letters Patent is:—

1. In a grain-shock elevator; a frame having side sills with their rear ends converging into one, a cross sill, posts and cross-beams and mounted upon traction wheels and a guide wheel, with means for attaching horses for propelling the machine, means for throwing the machine into and out of gear; a primary elevator to elevate the grain shocks; a transverse carrier at right angles to said primary elevator to receive the grain shocks therefrom and carry them toward one side of the machine; a secondary elevator in line with said carrier to take the grain shocks from the said carrier and discharge them; a forwardly projecting fork consisting of a head-bar having its ends pivotally secured in the sides of said frame near its front end; a series of fingers or prongs having their rear ends secured in the rear side of said head-bar and being bent upward and forward and slightly downward to glide under and raise the grain shocks from the ground, substantially as described.

2. In a grain shock elevator; a frame having side sills which converge into one rear extension a driver's seat carried by and a supporting post secured to said rear extension, said sills having a cross sill and posts secured thereto with cross beams and bars forming a framework; a pair of traction wheels carrying said framework to operate the machinery a guide wheel by which to guide the machine a fork head extending across the front portion of said machine a series of forwardly projecting fingers or prongs to raise the shocks from the ground said fingers being curved slightly upward near their points and having their rear ends bent downward and forward and secured in said fork-head said fork-head having its ends pivotally secured in the front end of the framework of the machine; a series of upwardly and rearwardly inclined slats $c'$ secured to the framework of the machine to constitute a primary elevator for sliding the grain shocks up on; a pair of chain belts mounted upon sprocket wheels and having means provided for driving the said chain belts; a plurality of rakes extending across the machine and having their ends pivotally secured in said chain belts to force the grain shocks up the said elevator; the rake tilting device consisting of a yoke $h$ firmly secured in one end of the head of each of said rakes, a tilting rod $i$ for each yoke having one of its ends pivotally secured in the said yoke, the chain belt links $g'$ each having a bolt passing through said links transversely and having one end of said tilting rod attached to said bolt to control the position of the said rakes, for the purpose specified.

3. In a grain shock elevator; a frame having side sills with their rear portions converging into a single rearward extension having a driver's seat and the foot of an upright supporting post secured to said extension and having secured to the side sills posts F and F' the cross sill B and the cross bar B' and the essential framework; a pair of traction wheels carrying said framework a rear guide wheel to direct the machine; a fork head extending across the front portion of said machine, a series of forwardly projecting fingers or prongs having at their points a slightly upward curve and having their rear portions uniformly bent downward and forward and secured in the rear portion of said fork head said fingers or prongs being adapted to glide under and raise the grain shocks from the ground; a series of inclined slats $c'$ having their lower ends secured immediately in rear of the said fingers and having their upper ends bent rearward and secured to the framework of the machine to form a primary elevator to slide the grain shocks upon; a pair of rake-carrying chain belts H and L; duplicate sprocket wheels their journals being independent of each other and secured at the front side portion of the machine frame to carry said chains duplicate sprocket wheels secured upon a horizontal shaft journaled to the upper portion of the aforesaid upright posts and having secured upon said shaft a sprocket driving wheel with means for rotating the same to actuate said chain belts; said chain belt having a plurality of chain-belt-journal-links $g$ having lateral journal openings therein; a plurality of rakes having heads extending across the machine and having their journal ends pivotally secured in said journal links of the chain belts to carry said rakes said rake heads having lateral teeth to force the grain shocks up the said elevator; a rake-tilting device consisting of a yoke secured in the head of each of said rakes near one of its ends and having a tilting-rod attached to said yoke and to one of the journal links $g$ of the said chain belt to regulate the position of the said rakes; a grain-shock carrier consisting of side plates, a floor, a pair of chain belts at each side of and above and below said floor and having the ends of a series of transverse slats attached to said chain belts, with means for actuating the same to move the grain-shocks toward one side of the machine, for the purposes specified.

In testimony whereof I affix my signature in presence of two witnesses.

JOHN JAMES.

Witnesses:
   Mrs. B. A. Torrington,
   W. I. Thorne.